Oct. 4, 1960  A. CAMPO  2,955,188

POWER SUCTION DESOLDERING TOOL

Filed Jan. 26, 1959  2 Sheets-Sheet 1

INVENTOR.
Alfred Campo.
BY Myron J. Seibold
ATTORNEY.

Oct. 4, 1960        A. CAMPO        2,955,188
POWER SUCTION DESOLDERING TOOL
Filed Jan. 26, 1959        2 Sheets-Sheet 2
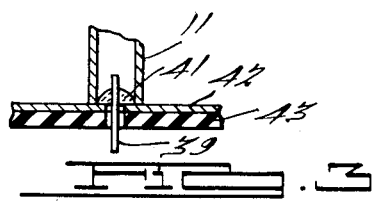
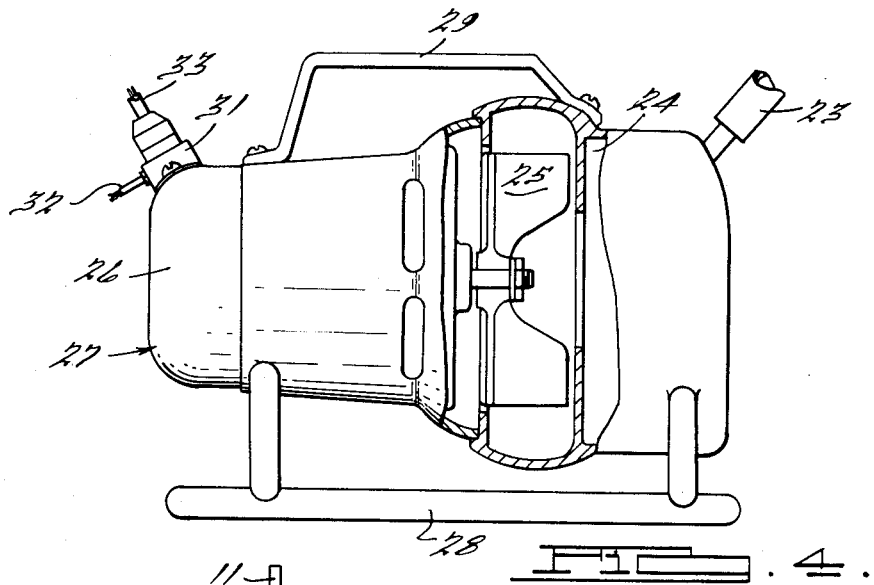
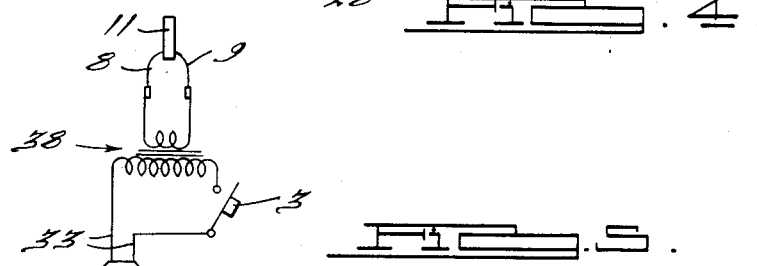
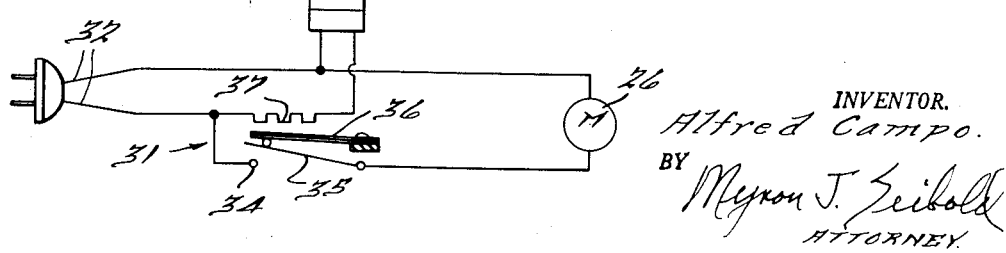
INVENTOR.
Alfred Campo.
BY
Myron J. Seibold
ATTORNEY.

United States Patent Office 2,955,188
Patented Oct. 4, 1960

2,955,188

POWER SUCTION DESOLDERING TOOL

Alfred Campo, 15045 Braile, Detroit 32, Mich.; Lillian M. Campo, executrix of said Alfred Campo, deceased Filed Jan. 26, 1959, Ser. No. 789,117

12 Claims. (Cl. 219—26)

This invention relates to a power suction desoldering tool applicable to existing soldering guns and particularly designed for work on printed circuit boards. The instant application is a continuation-in-part of copending application Serial Number 667,800, filed June 25, 1957, for Desoldering Tool, now Patent No. 2,882,380, granted April 14, 1959.

In the earlier application, there is disclosed a desoldering tool for the melting and suction removal of solder in which the suction means is specifically shown as applied orally by the operator. In larger scale operations and where the desoldering is operational over a considerable period of time, it is desired to relieve the operator of the oral effort and to provide a power suction source to effect removal of the melted solder and such is an object of this invention.

Another object of the invention is to provide a desoldering tool having a tubular tip of a size to fit over a component terminal in a printed circuit board with a suction source and a manually operable value to connect the tip to the suction source after melting of the solder to effect removal thereof without injury to the component and the board.

Another object of the invention is a desoldering tool in accordance with the preceding object in which the suction source is time controlled with relation to heating of the melting tip so that the source becomes operable substantially when the tip is raised to operating temperature.

Another object of the invention is a desoldering tool applicable to soldering guns and providing a valve on the gun in position to be readily operated by the thumb of the hand of the operator which grasps the handle of the gun together with a tubular tip of relatively high heat conductivity mounted on and heated by the gun and an external vacuum source connectible to the tip by operation of the valve to effect removal of molten solder by suction through the tip.

Another object of the invention is a desoldering tool in accordance with the preceding object in which an auxiliary tank is mounted on and carried by the gun on the suction side of the valve.

Other objects and features of the invention will be readily apparent to those skilled in the art from the specification and appended drawing illustrating certain preferred embodiments in which:

Figure 3 is a detail view in section showing the application of the tip of the desoldering tool about a component terminal in desoldering position.

Figure 4 is a view partly in elevation and partly in section of the vacuum source.

Figure 5 is a schematic wiring diagram of the electrical controls for both the heating gun and the motor driving the vacuum source.

Figure 1:
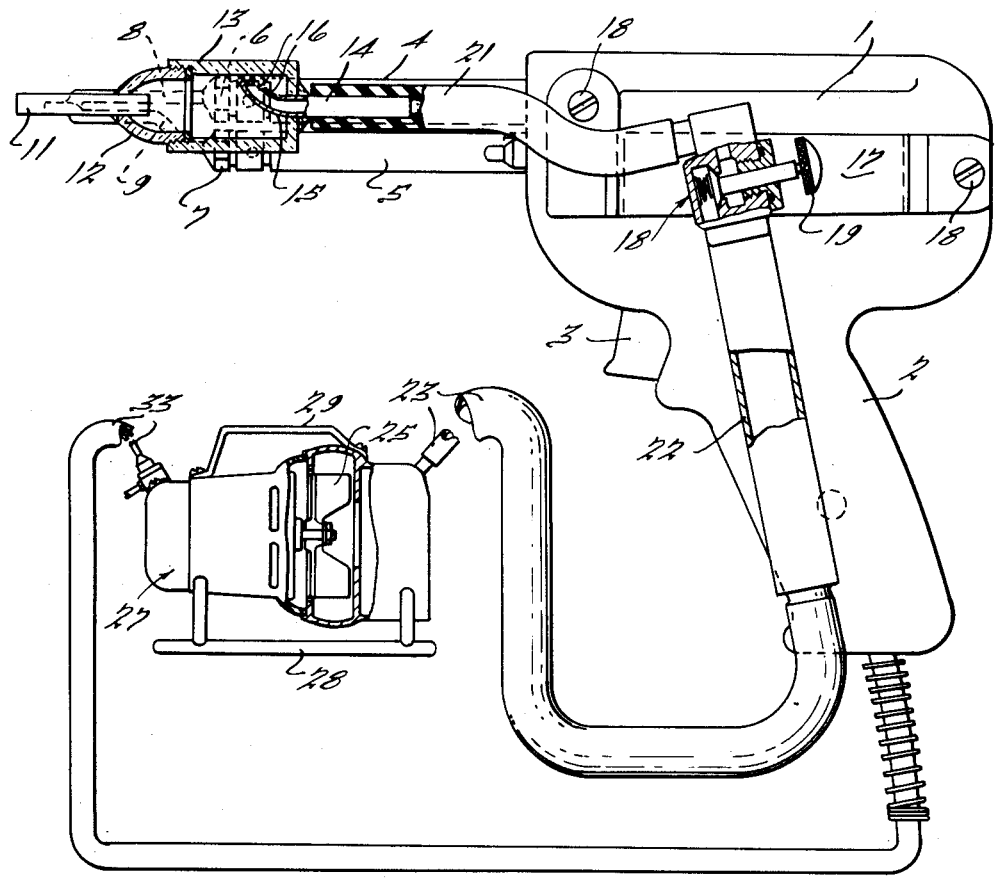
Figure 1 is a view partly in elevation and partly in section of a desoldering tool according to the present invention.
Figure 2:
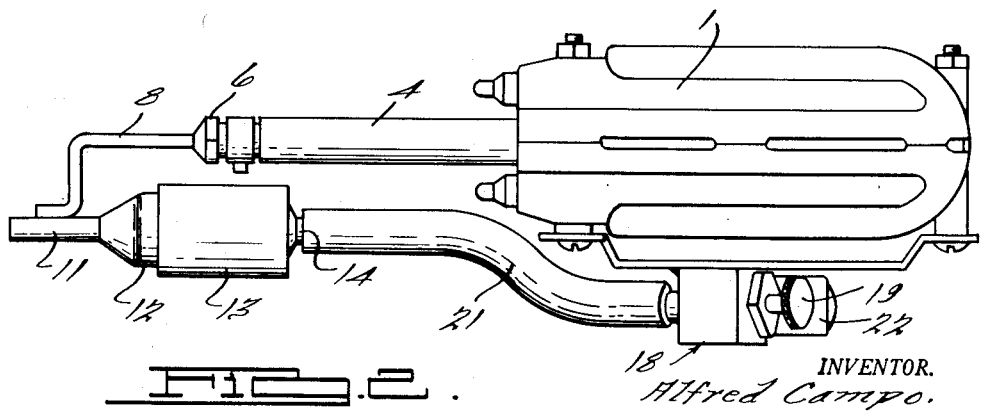
Figure 2 is a top plan view of the desoldering tool.

The power suction desoldering tool of this invention is illustrated as applied to a standard soldering gun having a main body portion 1 enclosing the transformer windings, a handle 2, a controlling switch trigger 3, and main conducting arms 4 and 5 terminating in end clamps 6 and 7, respectively.

Within clamps 6 and 7 are mounted heating arms 8 and 9 joined to form a closed loop adjacent whose midpoint is mounted a brazed or integral tube 11 of relatively high heat conductivity material, low mass, and an interior bore of a size to fit over the terminal of a board component. The arms 8 and 9 may be formed in any shape desired, but since they form a closed loop are herein referred to as of generally U-shape.

The rearward end of tube 11 has mounted thereover one end 12 of a cup or chamber of porcelain or other ceramic material having a rear end portion 13 within which is mounted a tube 14. The porcelain chamber is readily removable from the tubular tip 11 and the two parts 12 and 13 readily separated to remove solder collected within the chamber. The interior end of tube 14 is curved at 15 and in the protected side are a plurality of air openings 16.

At the left side of the main body portion 1 of the soldering gun is mounted a plate 17 by the same studs 18 which hold the halves of the gun body together. Upon the plate 17 is supported a valve 18 of the normally closed type as shown by the section og Figure 1. The valve plunger is operated to open position by depression of the button 19 positioned under the thumb of the hand of the operator which grasps the handle 2. A flexible tube 21 interconnects the tube 14 and the valve 18. Depending from the valve 18 is an auxiliary vacuum chamber 22 in communication with the vacuum side of the valve and connected by a flexible tube 23 to the main vacuum chamber 24 (Figure 4). Chamber 22 is spaced from the handle 2 to accommodate the operator's fingers.

Vacuum in chamber 24 is maintained by a centrifugal fan 25 driven by a motor 26. This power vacuum source has been designated generally by numeral 27 and is shown as mounted on runners 28 and provided with a carrying handle 29. Included in the electrical circuit is a time delay current controlled switch 31, shown in elevation only in Figure 4 but schematically in Figure 5. Connection is made thereto by source wires 32 and therefrom to the gun by connecting wires 33.

In the schematic diagram of Figure 5, the time delay current controlled switch 31 is shown with a stationary contact 34 and a normally open movable contact 35 actuated to closed position by a bimetallic member 36 heated by a resistor 37 in the gun circuit. Engagement of contacts 34 and 35 completes the circuit to motor 26. The gun transformer within main body portion 1 is indicated at 38 and in known manner has a light, many turn primary and a heavy lesser turn secondary to supply a heavy heating current at low voltage to effect a rapid heating of arms 8 and 9 and of tube 11.

In Figure 3, the tube 11 is shown in desoldering position with its projecting end surrounding a component terminal 39 soldered at 41 to the "printed" conductor 42 on a supporting board 43. It is seen that the end of the tubular tip is presented relatively evenly to the solder.

In the operation of the desoldering tool of this invention, the gun is actuated by closing trigger switch 3 to connect the primary of transformer 38 to the power source and thus pass a heavy secondary current through the heating element represented by the arms 8 and 9 to bring the tube 11 up to solder melting temperature. When heated, the tube 11 is placed over a component terminal as in Figure 3 to effect melting of the solder at 41.

The transformer primary current transverses the resistor 37 to heat the bimetal 36 and effect engagement of contacts 34 and 35 to energize motor 26 and drive fan 25 to establish a vacuum within main chamber 24 and, through tube 23, within auxiliary chamber 22. The time delay is set by switch adjustment so that the vacuum will be established by the time the solder is melted. When the solder has melted, the valve 18 is opened by pressing of button 19 to place the tube 11 in contact with the vacuum system and suck the molten solder into the porcelain chamber. The curvature of tube 14 at 15 and the protected position of openings 16 ensures retention of the solder globules within the porcelain chamber. As the chamber fills with the resoldified solder, it is removed from the tube 11 and the halves 12 and 13 separated to provide for ready dumping of the accumulation.

The function of auxiliary chamber 22 is to provide a vacuum of considerable volume immediately adjacent the valve 18 so that suction is applied to tip 11 immediately after opening the valve and without the necessity of passage through tube 23 which thus can be made smaller to lessen the drag on the gun as it is moved about.

While a particular preferred embodiment of the invention has been specifically disclosed, it is understood that the invention is not limited thereto, as many variations will be readily apparent to those skilled in the art and the invention is to be given its broadest possible interpretation within the terms of the following claims.

What is claimed is:

1. A desoldering tool comprising a generally U-shaped heating element for a transformer type soldering gun, a tubular tip of heat conductive metal and of low mass integrally mounted at the closed extremity of the heating element having an interior diameter of a size to receive a component terminal so that the end of the tip will be presented relatively evenly to the solder about the terminal to effect melting of the solder, power operated means for establishing a vacuum, valve means for controllably connecting said tubular tip to the vacuum to effect removal of the melted solder through the tip by suction, and means for mounting the operator of the valve means adjacent to the handle of the gun in position for ready engagement by the thumb of a hand grasping the gun.

2. A desoldering tool comprising a generally U-shaped heating element for a transformer type soldering gun, a tubular tip of heat conductive metal and of low mass integrally mounted at the closed extremity of the heating element having an interior diameter of a size to receive a component terminal so that the end of the tip will be presented relatively evenly to the solder about the terminal to effect melting of the solder, power operated means for establishing a vacuum, means for energizing said vacuum establishing means in response to energization of said gun, and valve means for controllably connecting said tubular tip to the vacuum to effect removal of the melted solder through the tip by suction.

3. A desoldering tool comprising a generally U-shaped heating element for a transformer type soldering gun, a tubular tip of heat conductive metal and of low mass integrally mounted at the closed extremity of the heating element having an interior diameter of a size to receive a component terminal so that the end of the tip will be presented relatively evenly to the solder about the terminal to effect melting of the solder, power operated means for establishing a vacuum, means for energizing said vacuum establishing means a predetermined time interval after energization of said gun, and valve means for controllably connecting said tubular tip to the vacuum to effect removal of the melted solder through the tip by suction.

4. A desoldering tool comprising a generally U-shaped heating element for a transformer type soldering gun, a tubular tip of heat conductive metal and of low mass integrally mounted at the closed extremity of the heating element having an interior diameter of a size to receive a component terminal so that the end of the tip will be presented relatively evenly to the solder about the terminal to effect melting of the solder, power operated means for establishing a vacuum, a current repsonsive switch controlling the energization of said vacuum establishing means, means connecting the current element of said switch in the gun circuit so as to be responsive to energization of the gun, and valve means having its operator located at the gun for controllably connecting said tubular tip to the vacuum to effect removal of the melted solder through the tip by suction.

5. A desoldering tool comprising a generally U-shaped heating element for a transformer type soldering gun, a tubular tip of heat conductive metal and of low mass integrally mounted at the closed extremity of the heating element having an interior diameter of a size to receive a component terminal so that the end of the tip will be presented relatively evenly to the solder about the terminal to effect melting of the solder, power operated means for establishing a vacuum, a control valve, a vacuum chamber, means mounting both said valve and chamber on said gun in closely connected relation, means connecting said chamber to said vacuum, and means connecting said valve to said tubular tip to controllably apply suction to effect removal of the melted solder through the tip.

6. A desoldering tool comprising a generally U-shaped heating element for a transformer type soldering gun, a tubular tip of heat conductive metal and of low mass integrally mounted at the closed extremity of the heating element having an interior diameter of a size to receive a component terminal so that the end of the tip will be presented relatively evenly to the solder about the terminal to effect melting of the solder, a main vacuum chamber, power operated means for establishing a vacuum in said chamber, an auxiliary vacuum chamber, a flexible tube interconnecting said chambers, a control valve, means mounting both said valve and auxiliary chamber on said gun in closely connected relation, and means connecting said valve to said tubular tip to controllably apply suction to effect removal of the melted solder through the tip.

7. A desoldering tool comprising a generally U-shaped heating element for a transformer type soldering gun, a tubular tip of heat conductive metal and of low mass integrally mounted at the closed extremity of the heating element having an interior diameter of a size to receive a component terminal so that the end of the tip will be presented relatively evenly to the solder about the terminal to effect melting of the solder, a main vacuum chamber, power operated means for establishing a vacuum in said chamber, an auxiliary vacuum chamber, a flexible tube interconnecting said chambers, a control valve, means mounting both said valve and auxiliary chamber on said gun in closely connected relation with the valve operator in position for ready engagement by the thumb of a hand grasping the gun and with the auxiliary chamber spaced from the gun handle to accommodate the hand fingers, and means connecting said valve to said tubular tip to controllably apply suction to effect removal of the melted solder through the tip.

8. A desoldering tool comprising a generally U-shaped heating element for a transformer type soldering gun, a tubular tip of heat conductive metal and of low mass integrally mounted at the closed extremity of the heating element having an interior diameter of a size to receive a component terminal so that the end of the tip will be presented relatively evenly to the solder about the terminal to effect melting of the solder, power operated means for establishing a vacuum, means for controllably connecting said tubular tip to the vacuum including a controlling valve and a solder collecting chamber between the valve and the tip, and means mounting both said valve and collecting chamber on the gun for movement therewith and with the operator for the valve in position to be engaged by a hand grasping the gun.

9. A manually manipulable desoldering tool comprising a heat transmitting element having a passage therein of a size to receive a component terminal so that the surface of said element defining the exterior end of the passage will be presented relatively evenly to the solder about the terminal to effect melting of the solder, means for heating said element to solder-melting temperature, power operated means for establishing a source of pressure differential with respect to atmospheric pressure, valve means for controllably connecting said passage to said source to effect removal of the melted solder from about the terminal, and means mounting said valve means on the tool in position to accommodate a hand grasping the tool and with the operator of the valve means in position for ready engagement by such hand.

10. A manually manipulable desoldering tool comprising a heat transmitting element having a passage therein of a size to receive a component terminal so that the surface of said element defining the exterior end of the passage will be presented relatively evenly to the solder about the terminal to effect melting of the solder, electrical means for heating said element to solder-melting temperature, electrical means energized from the same source as said heating means for establishing a source of pressure differential with respect to atmospheric pressure, valve means for controllably connecting said passage to said pressure differential source to effect removal of the melted solder from about the terminal, manual control means for initiating energization of at least said heating means, and means mounting both said manual control means and the operator for said valve means on the tool in positions for ready engagement by a hand grasping the tool.

11. A manually manipulable desoldering tool comprising a heat transmitting element having a passage therein of a size to receive a component terminal so that the surface of said element defining the exterior end of the passage will be presented relatively evenly to the solder about the terminal to effect melting of the solder, means for heating said element to solder melting temperature, a vacuum chamber, a control valve connecting said vacuum chamber to said passage, electrically operated means for establishing a vacuum in said chamber, and means mounting at least said valve and chamber on said tool in positions to accommodate a hand grasping the tool and with the operator for the valve positioned for ready engagement by such hand.

12. A manually manipulable desoldering tool comprising a heat transmitting element having a passage therein of a size to receive a component terminal so that the surface of said element defining the exterior end of the passage will be presented relatively evenly to the solder about the terminal to effect melting of the solder, means for heating said element to solder melting temperature, a vacuum chamber, a control valve connecting said vacuum chamber to said passage, electrically operated means for establishing a vacuum in said chamber, means mounting at least said valve and chamber on said tool in positions to accommodate a hand grasping the tool and with the operator for the valve positioned for ready engagement by such hand, manual control means for initiating energization of at least said heating means, and means mounting said manual control means on said tool in position for ready engagement by such hand.

References Cited in the file of this patent

UNITED STATES PATENTS

| | | |
|---|---|---|
| 828,439 | Strunsky | Aug. 14, 1906 |
| 1,724,070 | Byrne et al. | Aug. 13, 1929 |
| 2,609,778 | Bleam et al. | Sept. 9, 1952 |
| 2,826,667 | Brillinger | Mar. 11, 1958 |
| 2,882,380 | Campo | Apr. 14, 1959 |